United States Patent
DesJarlais

(10) Patent No.: US 9,939,008 B2
(45) Date of Patent: Apr. 10, 2018

(54) REMOTE THROTTLE CONTROL FOR A THROTTLE TRIGGER OF A VEHICLE

(71) Applicant: Mattco Enterprises Ltd., Winnipeg (CA)

(72) Inventor: Matthew G. DesJarlais, Winnipeg (CA)

(73) Assignee: Matteo Enterprises Ltd., Winnipeg, MB (CA)

( * ) Notice: Subject to any disclaimer, the term of this patent is extended or adjusted under 35 U.S.C. 154(b) by 0 days.

(21) Appl. No.: 14/996,954

(22) Filed: Jan. 15, 2016

(65) Prior Publication Data
US 2017/0204897 A1 Jul. 20, 2017

(51) Int. Cl.
*F16C 1/12* (2006.01)

(52) U.S. Cl.
CPC ...................... *F16C 1/12* (2013.01)

(58) Field of Classification Search
CPC .......... F16C 1/12; B62K 11/14; B62K 23/00; B62K 23/06; F16B 7/04; G05G 1/04; G05G 1/54; B62M 25/04; A01D 34/824; A01D 2034/6843
See application file for complete search history.

(56) References Cited

U.S. PATENT DOCUMENTS

| | | | |
|---|---|---|---|
| 3,580,100 A * | 5/1971 | McDermott | G05G 11/00 74/482 |
| 3,995,512 A * | 12/1976 | Johnsen | B62M 25/02 74/502.4 |
| 4,137,793 A * | 2/1979 | Sowell | B62K 23/04 188/77 R |
| 6,651,524 B2 * | 11/2003 | Dawson, Jr. | G05G 1/30 74/482 |
| 6,712,173 B2 * | 3/2004 | Esselink | B62M 27/02 180/315 |
| 7,093,518 B2 * | 8/2006 | Gmeilbauer | B25B 25/005 29/229 |
| 7,607,369 B2 * | 10/2009 | Cox | A01D 34/824 172/121 |
| 7,736,200 B2 * | 6/2010 | Sproesser | H01R 11/24 439/754 |
| 9,163,657 B2 * | 10/2015 | Gillet | F16C 1/12 |

FOREIGN PATENT DOCUMENTS

CA     2299064 A1 *  8/2000

* cited by examiner

*Primary Examiner* — Adam D Rogers
(74) *Attorney, Agent, or Firm* — Adrian D. Battison; Ade & Company Inc.; Kyle R. Satterthwaite

(57) ABSTRACT

A remote snowmobile throttle control device is provided for use with a snowmobile having a handle bar with a hand grip at one end with a manually operable throttle trigger adjacent the hand grip. The device comprises a Bowden cable with a manually operable trigger at one end and a coupling elastic band for mounting on the handle bar at the hand grip and a manually operable spring clamp with jaws for attachment to the throttle trigger. A tether holds the actuator to the user and the mounting on the handlebar is arranged to break away from the throttle trigger in the event that the cable is pulled excessively should the snowmobile move too far relative to the user.

15 Claims, 5 Drawing Sheets

REMOTE THROTTLE CONTROL FOR A THROTTLE TRIGGER OF A VEHICLE

This invention relates a remote throttle control for a throttle trigger of a vehicle such as a snowmobile or ATV which is designed primarily for use in a safety situation where the vehicle has become stuck by being embedded in the snow and requires additional force to be removed from its embedded position. The device can however be used in other situations where a remote throttle action is required.

BACKGROUND OF THE INVENTION

As described in U.S. Pat. No. 6,712,173 issued to Esselink on Mar. 30 2004 which corresponds to Canadian Patent 2,299,064 issued Apr. 17 2007, snowmobiling is a very popular recreational pastime. One drawback of snowmobiles, however, is that they sometimes get stuck. When this occurs, because snowmobiles are heavy, they are very difficult to manoeuvre. Often what is required is that the operator, who is often alone, must walk to the front of the snowmobile and try to free the snowmobile by pulling on the front skids or otherwise on the front end of the snowmobile. It is often advantageous in assisting freeing the snowmobile to have a second person operate the throttle of the snowmobile as the snowmobile operator is tugging on the front end to thereby gain the assistance of the snowmobile's motivating force as the front skis are dislodged. It is also advantageous to be able to control the throttle by foot pressure rather than solely by use of a thumb control.

When however the operator is alone, it is not possible to simultaneously pull on the front of the snowmobile and operate the snowmobile throttle which is typically located as a thumb controlled lever on the snowmobile handle bar.

Consequently, the above patent provides an arrangement in which a cable conduit is mounted to the throttle coupler and to the remote actuator. The push/pull cable is slidably journaled in the conduit so as to be mounted at a first end of the push/pull cable to the throttle coupler and at an opposite second end to the remote actuator. Actuation of the remote actuator thereby actuates movement of the throttle coupler so as to actuate the throttle controller correspondingly. The remote actuator includes a pivotable member pivotally mounted to a base member about a pivot on the base member. The second end of the push/pull cable is mounted to a first end of the pivotable member. An opposite second end of the pivotable member is manually operable so as to rotate the pivotable member about the pivot relative to the base member to thereby push or pull the second end of the flexible cable respectively into, or from, the cable conduit. This respectively, extends or retracts the first end of the push/pull cable respectively from, or into, the conduit to actuate the throttle coupler and thereby to actuate the throttle controller on the snowmobile.

This arrangement is however complicated in construction and lacks safety systems which can remove the throttle operation to halt the machine in the event that any difficulties arise during the operation.

SUMMARY OF THE INVENTION

According to the invention there is provided a remote throttle control device for use with a vehicle having a handle bar with a hand grip at one end with a manually operable throttle trigger adjacent the hand grip, the device comprising:

a Bowden cable having a sheath and an actuator wire;
a manually operable actuator at one end of the Bowden cable for pulling the actuator wire relative to the sheath;
a coupling member for manual mounting on the handle bar at the hand grip;
and a manually operable clamp for attachment to the trigger;
the coupling member and the clamp being arranged such that pulling of the wire relative to the sheath causes relative movement of the coupling member and the clamp for actuating the throttle trigger to a position determined by the actuator.

In accordance with an important improvement the manually operable clamp is a spring clamp with manually squeezable levers for releasing the clamp. That is the manually operable clamp includes a pair of spring jaws which engage on the top and bottom of the trigger from the outer end of the trigger where each jaw is attached to a lever so the squeezing of the levers open the jaws for engagement and the trigger. The pivot for the clamp is located at the end of the trigger. In this way and effective pulling action is applied while the clamp can be pulled away from the trigger on the application of excessive force.

In accordance with an important improvement the manually operable clamp includes a first transversely arched concave blade shaped to extend over an end of the trigger and to engage an outer surface of the trigger and a second convex blade shaped to engage an inner surface of the trigger.

In this way the manually operable clamp is arranged to pull away from the trigger when the Bowden cable is pulled for example in the event that the trigger is pulled to position which the snowmobile moves beyond the control of the rider or operator. Thus this release action acts as a safety system so that the rider is at a reduced risk of being run over by the snowmobile and the snowmobile cannot escape to a remote location. In order to achieve this the manually operable actuator includes a tether which is attached to the rider during the operation so that the whole device is pulled by the tether away from the snowmobile in the event that the trigger is operated beyond a required position.

Preferably the manually operable clamp includes a lever portion shaped to engage the hand grip when a pulling force is applied to the device to bring the manually operable clamp up to the hand grip to roll the manually operable clamp off the trigger. Thus in a position where a pulling action occurs on the device in a situation where the tethered system is held by the rider while the snowmobile is moving away from the rider, a pulling action tending to bring the trigger up to the handlebar causes the lever portion to twist the clamp off the trigger.

In accordance with an important improvement the coupling member comprises an elastic strap arranged to be manually wrapped around the hand grip with a fastener to hold the strap to the coupling member by an elastic force from the strap when wrapped. This simple arrangement where the fastener comprises a pin for engaging a selected hole in the elastic strap allows the coupling member to be directly attached to the handgrip simply by the rider when required without interfering with the operation of the machine during normal use. The elastic strap thus holds a sleeve for holding the sheath end in a position immediately adjacent the trigger.

In accordance with an important improvement the coupling member on the hand grip adjacent the trigger includes a channel portion for engaging an end member of the sheath, the channel portion having an open face allowing the end member to be pulled from the channel portion by a side force on the end member. This acts to leave the coupling member at the handgrip so that the Bowden cable applies only force to the clamp pulling away from the trigger.

Preferably the manually operable actuator includes a spring acting to pull the actuator wire relative to the sheath to a position in which no actuating force is applied to the trigger. That is, in a rest position of the actuator and cable there is no pulling force on the trigger that pulling force is only applied when the rider operates the actuator.

Preferably the spring is arranged such that it extends to allow bending of the Bowden cable acting to pull the sheath relative to the actuator wire to occur without applying an actuating force through the actuator wire to the trigger. That is the spring is mounted so that it can move in a direction opposite to the pulling force since the twisting or bending of the Bowden cable, otherwise tend to pull the wire applying the movement to the trigger inadvertently.

Preferably the manually operable actuator includes a slide housing containing a slide, a manually graspable handle on the slide housing and a trigger attached to the slide for applying a pulling force to the slide. In this arrangement a spring is mounted in the slide housing for resisting the sliding movement of the slide.

Preferably the only connection from the manually operable actuator to the snowmobile is through the Bowden cable so that a pulling action from a snowmobile operator to the snowmobile is effected directly by the snowmobile operator rather than a pulling cable. That is there is no handlebar or tether arrangement provided as part of the manually operable device on the components therefore are relatively small and can be easily stored on the limited storage area available on the snowmobile.

The arrangement as described hereinafter this provides a simple mechanical device with a clip mounted on the handle bar which is connected by a six-foot cable to actuator gun. In one example the device can weigh less than a pound and rolls up into a 9 inch square bag easily kept in a storage compartment.

When the snowmobile is stuck, typically one or two persons pull on the skis while the rider actuates the throttle. However if the rider is alone is not possible without this device to pull on the ski and simultaneously actuate the throttle. The present device resolves these issues. The device also avoids the necessity for the rider to dig packed snow or to lift the snowmobile, both of which can lead to significant health and safety concerns.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 4:
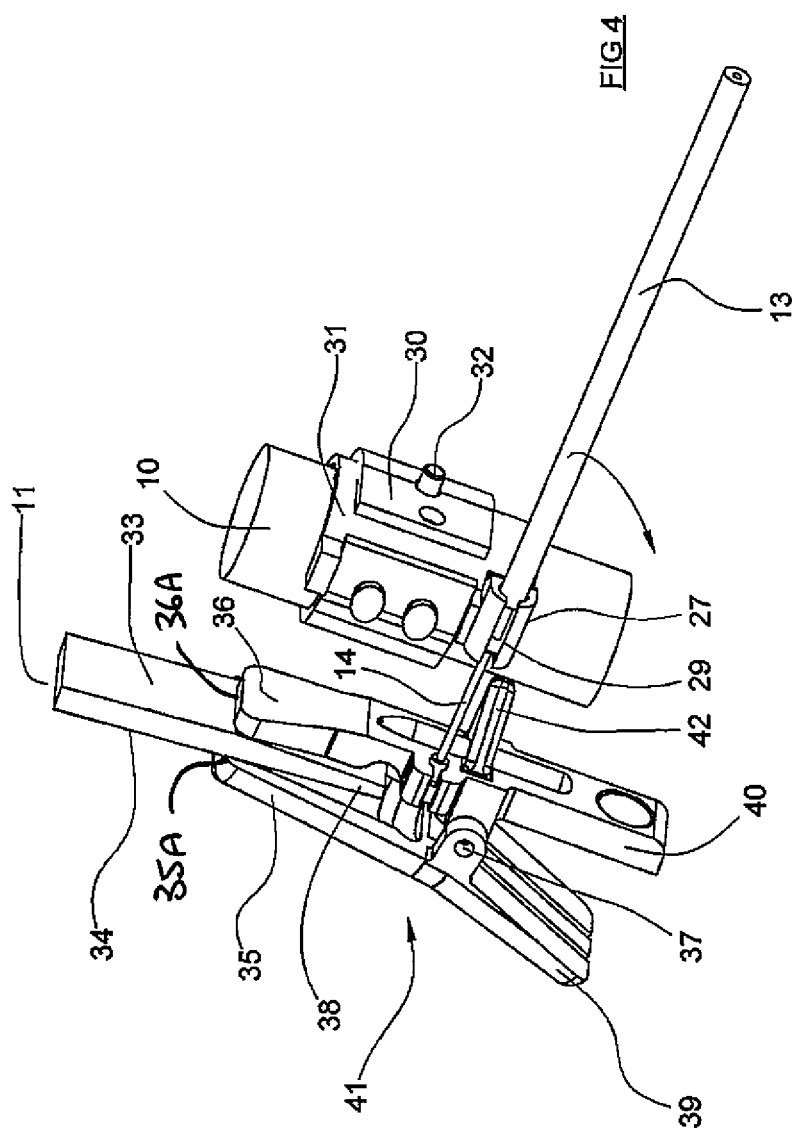
FIG. 4 is an isometric view showing the attachment of the apparatus of FIG. 1 to the handlebar of a snowmobile and showing the breakaway action by which the cable is pulled out of the coupling on the handgrip.
Figure 5:
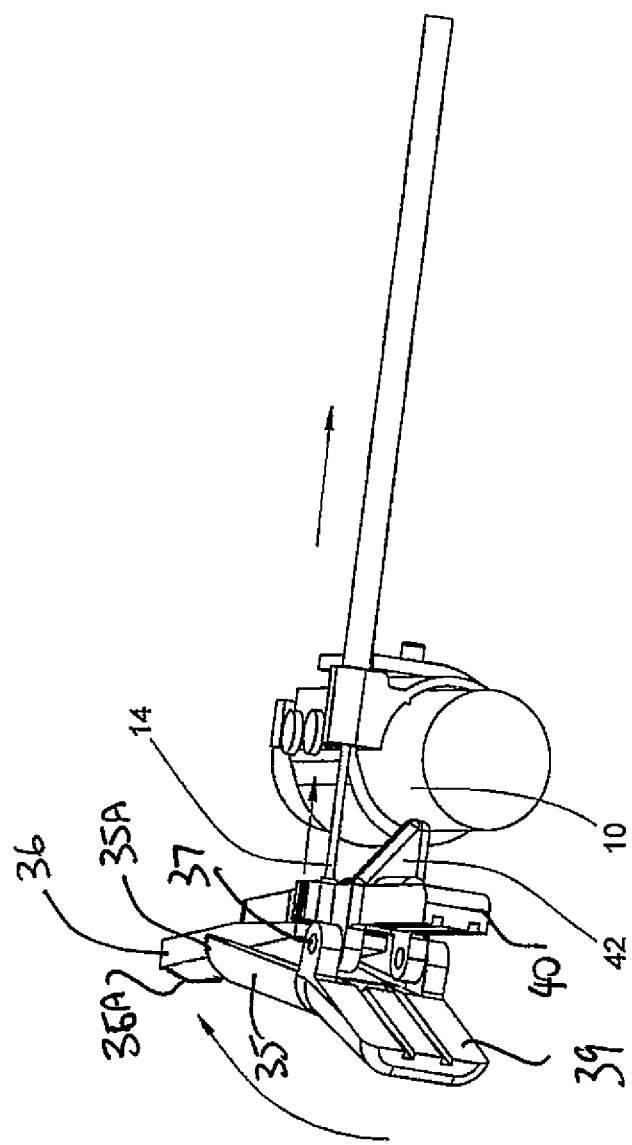
FIG. 5 is an isometric, view of the handgrip and coupling of FIG. 4 showing the breakaway action by which the trigger clamp is pulled off the trigger in the event of the trigger reaches a position close to the handgrip.

In the figures is shown a remote snowmobile throttle control apparatus for use with a snowmobile including a handgrip 10 and a trigger 11 of a handlebar as best shown in FIGS. 4 and 5.

Figure 1:
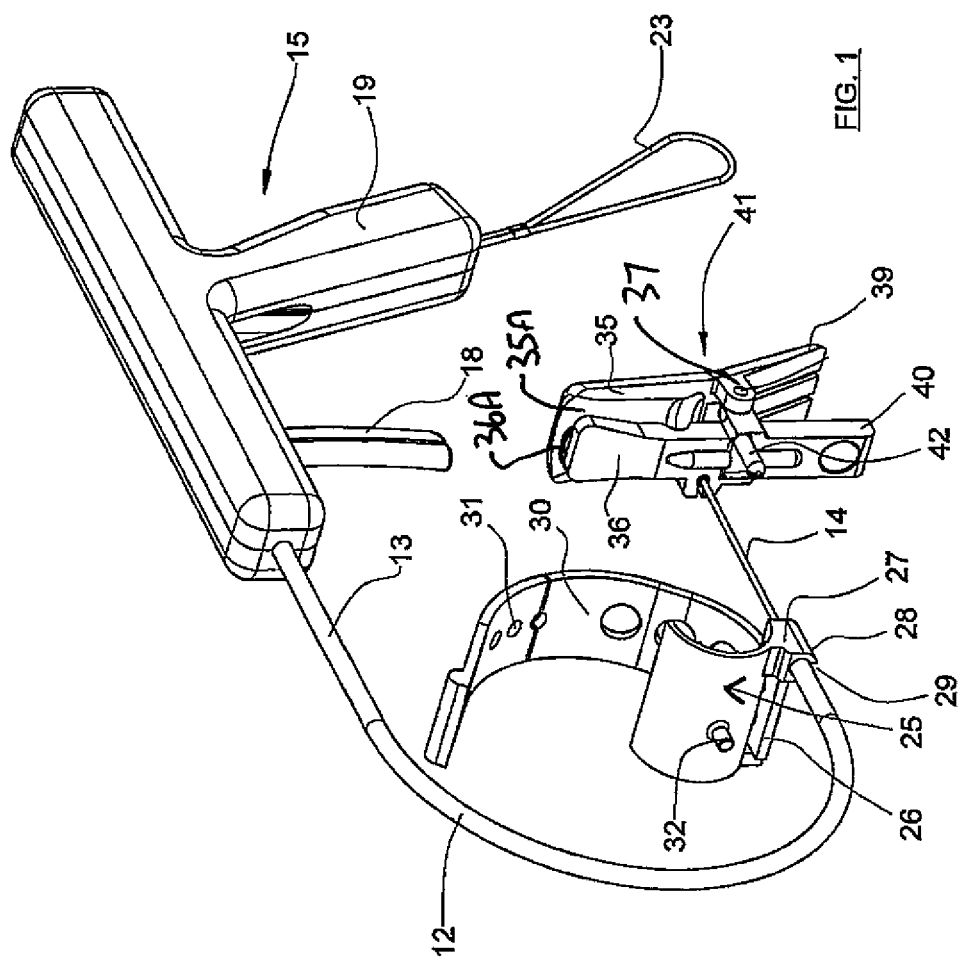
FIG. 1 is an isometric view of the apparatus of the present invention separate from a snowmobile with which it is intended to be used.
Figure 2:
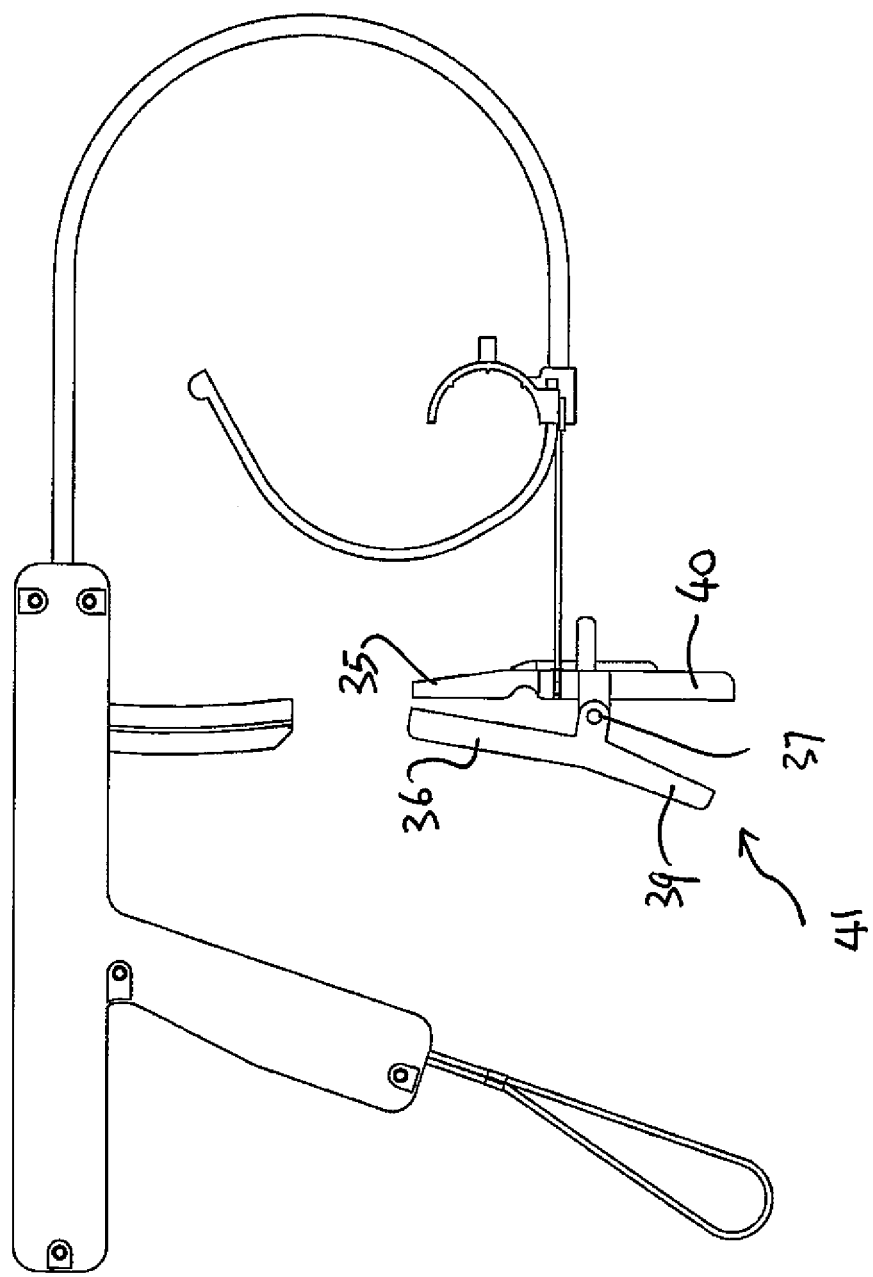
FIG. 2 is a side elevational view of the apparatus of FIG. 1.
Figure 3:
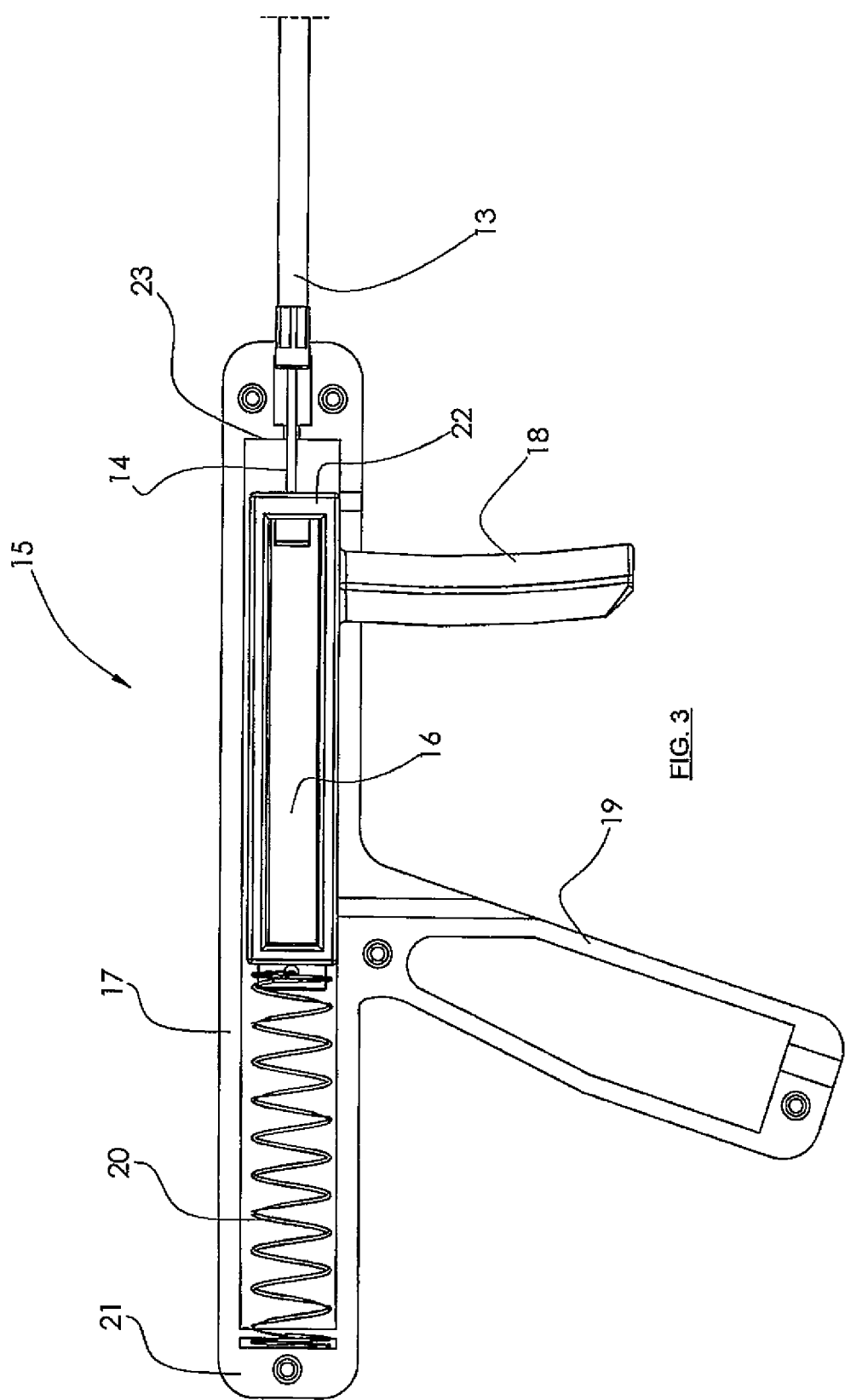
FIG. 3 is a cross-sectional view longitudinally of the hand-operated trigger of the apparatus of FIG. 1.

The device as shown in FIG. 1 comprises a conventional Bowden cable 12 with an outer sheath 13 and an inner actuator wire 14. At the remote end of the cable is provided a manually operable actuator generally indicated at 15 which operates to pull the wire 14 along the sheath when actuated by the hand of the rider. As best shown in FIG. 3, the actuator 15 includes a slide 16 mounted within a housing 17 which moves along the housing when pulled by a finger grip 18 by the hand of the user engaged over a handle portion 19 of the housing 17. The hand of the user wraps around the handle and the finger grip and pulls the slide 16 along the housing within a channel against the resistance of a spring 20. The end of the cable wire 14 is attached to the slide and the end of the sheath 13 is attached to the housing. In a rest position of the slide 16, it is held by the position spaced from a base 21 of the housing by the spring 20. In this rest position of the spring a forward end 22 of the slide is spaced from a forward end 23 of the housing leaving some slack in the cable 14. In the event that the cable is bent by wrapping around an object or in general manipulation by the user, this bending action tends to pull the wire 14 along the sheath 13. This retraction of the wire is taken up by the movement of the slide against the pulling action of the spring 20 and hence is not communicated to the opposite end of the wire where it could cause unintentional operation of the snowmobile throttle.

The actuator 15 also includes a tether 23 which is initially wrapped around the wrist of the user before the device is operated so that the actuator, cable and operating components are all held by the user and remain with the user in the event that the snowmobile unintentionally moves away from the user.

The apparatus further includes a coupling member 25 for mounting on the handgrip of the handlebar. This comprises a base portion 26 which carries at one side and end receptacle 27 for the end of the sheath 12. This comprises a channel 28 with an open mouth 29 so the downward force on the end of the sheath will cause the end of the sheath to be pulled out of the channel and thus released from the coupling 25. The coupling 25 is held in position on the handgrip of the handlebar by an elastic strap 30 which wraps around the handgrip and can be locked if stretched to position where a hole 31 of the strap is engaged onto a pin 32 of the base 26 to hold the coupling at a position surrounding the handgrip. The use of an elastic strap allows the coupling to be mounted very quickly and on handgrips of different diameter. The channel 27 is thus held in position across the handgrip supporting the sheath in the position projecting the wire 14 toward the trigger 11.

The end of the wire 14 is attached to the trigger 11 by a spring clamp 41 which engages top and bottom surfaces 33 and 34 of the trigger. It is well-known that such triggers are arched in shape so that the bottom surface 34 is slightly convex. Thus the spring clamp 41 includes a bottom jaw 35 for engaging the bottom surface of the trigger on the top jaw 36 for engaging the top surface 33. The bottom jaw is wider than the top jaw so that the trigger is effectively contained between the jaws with the transverse pivot axis 37 of the jaws across the end of the trigger as indicated at 38. Thus as described above and as shown in FIG. 1, the clamp 41 is pivotal about the transverse pivot axis 37 and includes a first transversely arched concave blade 35 including an inner surface 35A shaped to extend over an end of the trigger and of a concave shape to engage the arched outer surface of the trigger and a second convex blade 36 including an inner surface 36A. The jaws are attached to manually operable squeeze members 39 and 40 which operate the jaws for engagement and release of the trigger.

The blade or jaw 36 carries at the pivot a lever portion 42 which projects outwardly away from the back of the blade 36 in a direction toward the handgrip. Thus as shown in FIG. 5, in the event that the trigger is pulled by the cable toward the handgrip by unintended operation of the cable which could become wrapped around the handlebar, the lever member 42 engages the handgrip and acts to twist the clamp off the trigger releasing it from any further pulling action on the trigger.

In operation the handle bar's strap is attached to the handlebar and the spring-loaded throttle clip is attached to the thumb actuated throttle of the snowmobile. On the other end the actuator gun is operated to apply pressure to the thumb actuated throttle of the snowmobile. The six-foot cable allows the rider to stand on either side of the sled and pulled forwards on the ski tip while simultaneously actuating the throttle to get the track moving. This allows the device to get the sled out from its stuck position and back on top of the snow. Should the throttle control become stuck for any reason and the machine starts to pull away, the tether cord will remain attached to the wrist of the rider and the remote actuator assembly will break away from the handlebar to cease actuating the throttle.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A remote throttle control device for use with a vehicle having a handlebar with a comprising:
   a Bowden cable having a sheath and handgrip at one end with a manually operable throttle trigger adjacent the handgrip and arranged for pivotal movement of the throttle trigger toward the handgrip, the device an actuator wire;
   a manually operable actuator at one end of the Bowden cable for pulling the actuator wire relative to the sheath;
   a coupling member for mounting on the handlebar at the handgrip;
   and a manually operable clamp for attachment to the throttle trigger;
   the coupling member and the clamp being arranged when mounted to the handlebar and the throttle trigger respectively such that pulling of the actuator wire relative to the sheath causes relative movement of the coupling member and the clamp for causing said pivotal movement of the throttle trigger toward the handgrip to a position determined by the actuator;
   wherein the manually operable clamp includes a lever portion shaped to engage the handgrip when a pulling force is applied to the Bowden cable to bring the manually operable clamp up to the handgrip to roll the manually operable clamp off the throttle trigger.

2. The device according to claim 1 wherein the manually operable actuator includes a spring which extends to allow bending of the Bowden cable acting to pull the sheath relative to the actuator wire to occur without applying an actuating force through the actuator wire to the throttle trigger.

3. The device according to claim 1 wherein the coupling member includes a channel portion for engaging an end member of the sheath, the channel portion having an open face allowing the end member to be pulled from the channel portion by a side force on the end member.

4. The device according to claim 1 wherein the manually operable actuator includes a slide housing containing a slide, a manually graspable handle on the slide housing with the throttle trigger attached to the slide for applying a pulling force to the slide.

5. The device according to claim 4 wherein the manually operable actuator includes a spring in the slide housing for resisting a sliding movement of the slide.

6. The device according to claim 1 wherein the manually operable clamp includes a first jaw and a second jaw for clamping to outer and inner surfaces respectively of the throttle trigger, wherein the first jaw of the manually operable clamp comprises a first inner jaw surface which forms a concave channel extending longitudinally of the first jaw from a jaw pivot axis toward a tip of the first jaw, and wherein the second jaw of the manually operable clamp comprises a second inner jaw surface which extends longitudinally of the second jaw from the jaw pivot axis toward a tip of the second jaw, the first and second jaws thus being shaped to extend over an end of the throttle trigger with the jaw pivot axis at the end of the throttle trigger transverse to the handlebar and parallel to a throttle trigger pivot axis with the first inner jaw surface engaging an outer surface of the throttle trigger remote from the handgrip and the second inner jaw surface engaging an inner surface of the throttle trigger adjacent the handgrip.

7. The device according to claim 1 wherein the coupling member comprises an elastic strap wrapped around the handgrip.

8. The device according to claim 1 wherein the manually operable clamp includes a first manually squeezable lever integrally formed with the first jaw and a second manually squeezable lever integrally formed with the second jaw wherein the first lever and the second lever pivot about a jaw pivot axis transverse to the levers and to the jaws for releasing the clamp.

9. A remote throttle control device for use with a vehicle having a handlebar with a handgrip at one end with a manually operable throttle trigger adjacent the handgrip and arranged for pivotal movement of the throttle trigger about a throttle trigger pivot axis transverse to the handlebar toward the handgrip, the device comprising:
   a Bowden cable having a sheath and an actuator wire;
   a manually operable actuator at one end of the Bowden cable for pulling the actuator wire relative to the sheath;
   a coupling member for mounting on the handlebar at the handgrip;
   and a manually operable clamp including a first jaw and a second jaw for clamping to outer and inner surfaces respectively of the throttle trigger;
   wherein the manually operable clamp includes a first manually squeezable lever integrally formed with the first jaw and a second manually squeezable lever integrally formed with the second jaw wherein the first lever and the second lever pivot about a jaw pivot axis transverse to the levers and to the jaws for releasing the clamp;

wherein the first jaw of the manually operable clamp comprises a first transversely arched concave blade which forms a concave channel extending longitudinally of the first jaw from the jaw pivot axis toward a tip of the first jaw;

wherein the second jaw of the manually operable clamp comprises a blade which extends longitudinally of the second jaw from the jaw pivot axis toward a tip of the second jaw;

the first and second jaws thus being shaped to extend over an end of the throttle trigger with the jaw pivot axis at the end of the throttle trigger transverse to the handlebar and parallel to the throttle trigger pivot axis with an inner surface of the first jaw engaging the outer surface of the throttle trigger remote from the handgrip and an inner surface of the second law engaging the inner surface of the throttle trigger adjacent the handgrip;

the coupling member and the clamp being arranged when mounted to the handlebar and the throttle trigger respectively such that pulling of the actuator wire relative to the sheath causes relative movement of the coupling member and the clamp for causing said pivotal movement of the throttle trigger toward the handgrip to a position determined by the actuator.

10. The device according to claim 9 wherein the manually operable clamp pulls away from the throttle trigger when the Bowden cable is pulled.

11. The device according to claim 9 wherein the manually operable clamp includes a lever portion shaped to engage the handgrip when a pulling force is applied to the Bowden cable to bring the manually operable clamp up to the handgrip to roll the manually operable clamp off the throttle trigger.

12. The device according to claim 9 wherein the coupling member comprises an elastic strap wrapped around the handgrip.

13. The device according to claim 9 wherein the coupling member includes a channel portion for engaging an end member of the sheath, the channel portion having an open face allowing the end member to be pulled from the channel portion by a side force on the end member.

14. The device according to claim 9 wherein the manually operable actuator includes a slide housing containing a slide, a manually graspable handle on the slide housing with the throttle trigger attached to the slide for applying a pulling force to the slide.

15. The device according to claim 14 wherein the manually operable actuator includes a spring in the slide housing for resisting a sliding movement of the slide.

* * * * *